Nov. 26, 1968 C. V. FREIMAN 3,413,599
HANDLING OF INFORMATION WITH COSET CODES
Filed May 31, 1963 4 Sheets-Sheet 1

INVENTOR
CHARLES V. FREIMAN
BY Bernard N. Wiener
ATTORNEY

United States Patent Office 3,413,599

Patented Nov. 26, 1968

3,413,599
HANDLING OF INFORMATION WITH COSET CODES

Charles V. Freiman, Pleasantville, N.Y., assignor to International Business Machines Corporation, New York, N.Y., a corporation of New York Filed May 31, 1963, Ser. No. 284,430
2 Claims. (Cl. 340—146.1)

This invention relates to the handling of information with block codes and it relates more particularly to error detection and correction where information is to be transmitted in the form of group codes on an asymmetric channel or in a channel where long sequences of a particular symbol are undesirable.

A channel for information is the link between an information source and an information sink. Illustratively, it may be a communication channel or a memory. If information is established on a memoryless symmeteric channel through assignment of physical signals to information symbols, there is the same probability for correct receipt of each information symbol whatever the assignment of the channel input signals thereto. However, for information established on an asymmetric channel, there are different probabilities for correct transmission dependent upon the assignment of input signals to information symbols. Illustratively, there is the same probability for correct transmission of either binary 0 or 1 in a binary symmetric channel, whereas there are different probabilities for correct transmission of binary 0 or 1 in a binary asymmetric channel.

Group codes and coset codes are examples of block codes wherein the same number of symbols are used for every codeword and each word or character output of the information source is uniquely assigned to one of the codewords of a code. Illustratively, in a binary block code of length 6, the binary digit sequence 010101 may be used to represent the letter A each time it is transmitted on a channel.

Every group code has the property that one of its codewords is a symbol sequence comprised entirely of 0's. In many channels, a concatenation of this codeword, and sometimes one such codeword, is undesirable, if not prohibited. A coset code of a group code does not contain a codeword having a symbol sequence comprised solely of 0's.

For a particular codeword of any code, the probability of correct transmission thereof in a channel depends upon the parameters of the channel and the composition of the codeword. In particular, in a memoryless binary channel, the performance depends both on the number of 0's and 1's in a codeword and the probabilities of correct transmission of 0 and of 1.

It has been discovered for the practice of this invention—that it is often possible to improve the probability of correct transmission of information on a channel obtainable by a group code by transforming the group code to a related coset code.

The channel asymmetry encountered during transmission often varies as a function of time or as a function of the particular channel employed. In referring to either of these two situations herein, the phrase "time varying channel" is to be utilized.

In certain transmission channels information of a control nature is not available from one or more of the transmitted signals. Illustratively, in a magnetic tape unit employing non-return to zero recording technique, the occurrence of a 0 does not provide information as to word time. The phrase "word time" is used herein to describe the period of time during which the receiver input gates are open to accept a word or character. Similarly, in certain binary data communication channels, the occurrence of a 1 is used to synchronize a local oscillator at the receiver in order to provide binary digit synchronization. In a synchronous system, some form of clock source is necessary when no clock information is specifically included in the transmitted character sequence. An oscillator or free-running multivibrator is often employed at the receiver and is triggered or synchronized by the occurrence of 1's in the incoming data. In such cases, long sequences of 0's create a danger of a loss of binary digit synchronizaiton.

Background references of interest for the practice of this invention are:

(a) Book: "An Introduction to Probability Theory and Its Application," second edition, by W. Feller, John Wiley & Sons, Inc., 1957.

(b) Article: "Error Detecting and Error Correcting Codes," by R. W. Hamming, Bell System Technical Journal, vol. 29, 1950, pp. 147–160.

(c) Book: "Error Correcting Codes," by W. W. Peterson, John Wiley & Sons Inc., 1961.

(d) Article: "A Class of Binary Signaling Alphabets," by D. Slepian, Bell System Technical Journal, vol. 35, 1956; pp. 203–234.

(e) Book: "Modern Algebra," vol. 1, second edition by B. L. van der Waerden, F. Ungar Publishing Co., 1953.

It is an object of this invention to provide apparatus for information handling with block codes.

It is another object of this invention to provide apparatus for information handling with block codes over an asymmetric channel.

It is another object of this invention to provide apparatus for information handling with group codes.

It is another object of this invention to provide apparatus for information handling over an asymmetric channel with coset codes.

It is another object of this invention to provide apparatus for information handling over a channel whose asymmetry is time varying.

It is another object of this invention to provide apparatus for information handling over a channel where long sequences of a particular signal are undesirable or prohibited.

The foregoing and other objects, features and advantages of the invention will be apparent from the following more particular description of preferred embodiments of the invention, as illustrated in the accompanying drawings.

Figure 1:
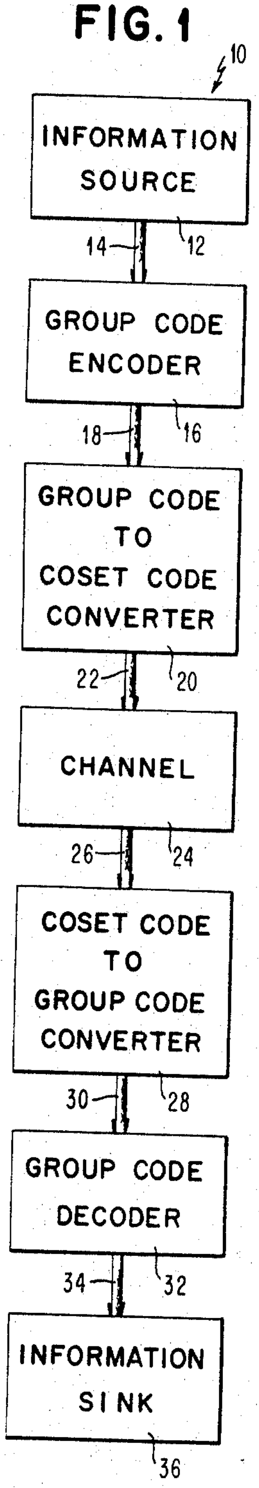
FIGURE 1 is a block diagram illustrating the general practice of this invention.

Generally, this invention provides apparatus for information handling with group codes. Particularly, it provides apparatus for information handling over either an asymmetric channel or over a time varying channel with coset codes. The information to be transmitted on the channel is established in group code form and then converted to coset code form. The coset codewords are introduced to the channel and information received therefrom is reconverted to the corresponding group codeword. The group codeword is then decoded to the original information.

In one aspect of the invention the received coset codeword is tested directly for the error syndrome in order to determine if the perturbating channel has caused the information to be transmitted incorrectly. In another aspect of the invention, information is handled in binary form. In another aspect of the invention, information is handled in ternary form.

Coset codes of close-packed single error correcting group codes are utilized in the practice of this invention in memoryless binary channels. In the case of close-packed single error-correcting (Hamming) codes, it will be shown hereinafter that any coset code always out-performs the equivalent group code in an asymmetric channel. In a perfectly symmetric channel, a group code and a corresponding coset code perform equally well. For example, the codewords 000 and 111 form a group of two codewords. A coset for this code would consist of the codewords 001 and 110. The latter always out-performs the former except in a perfectly symmetric channel in which case the two perform equally well.

In the practice of this invention, a coset code may be formed by first forming group codewords and then adding a fixed binary digit sequence to each codeword before transmission or storage. The same sequence is then subtracted from the received sequence before decoding. Subtraction of a sequence is defined as addition of the inverse sequence. This results in a sequence which may be decoded as though the original transmitted codeword were from the group code and not the coset code. In the binary case addition and subtraction modulo-2 are identical operations. Illustratively, a group code may be formed by taking multiples of a generator polynomial $$G(X)=x^3+x+1$$

to obtain a group code of minimum distance 3 with codewords of length 7. In the simplest implementation, binary digit sequence 1000000 is added before and after transmission. The received binary digit sequence is divided by $x^3+x+1$. If the remainder is zero, the transmission is accepted. Any non-zero remainder results in a detected error signal and error correction is then performed on the basis of this non-zero remainder.

*Cosets of group codes*

Aspects of group theory which are pertinent for the practice of this invention will now be described. A "group" is defined as a set of elements with a group operation termed herein addition which satisfies the following conditions:

(a) There exists a unique sum present in the group for every two elements therein.

(b) The group operation is associative, i.e., the sum of more than two elements is independent of the order in which the operation is performed thereon. A group is termed Abelian when the operation is commutative, i.e., the sum of two elements is independent of the order of the elements.

(c) There is an identity element in the group whose sum with any other element in the group gives the element itself.

(d) For each element in a group, there is an inverse element in the group such that the sum of these elements is the identity element.

When a subset of elements in a group satisfies the above properties, it is termed a subgroup. A coset of a subgroup is the set of elements which is obtained when each element of the subgroup is added to a non-subgroup element of the group. Thus, the usage herein does not term the subgroup itself a coset although it is so termed by some authors. Once a subgroup has been defined, the assignment of group elements to cosets is disjoint and unique, i.e., no group element will belong to more than one coset and each element belongs to the subgroup or to one coset. The following Table I illustrates the relationship of cosets to the subgroup of a group. The symbol $\oplus$ indicates the sum operation for the group.

TABLE I

| Subgroup | I | $A_2$ | $A_3$ | ... | $A_\mu$ |
|---|---|---|---|---|---|
| Cosets | $S_2\oplus I=S_2$ | $S_2\oplus A_2$ | $S_2\oplus A_3$ | ... | $S_2\oplus A_\mu$ |
| | $S_3\oplus I$ | $S_3\oplus A_2$ | $S_3\oplus A_3$ | ... | $S_3\oplus A_\mu$ |
| | ------ | ------ | ------ | ------ | ------ |
| | $S_\nu\oplus I$ | $S_\nu\oplus A_2$ | $S_\nu\oplus A_3$ | ... | $S_\nu\oplus A_\mu$ |

For binary block codes with block length $n$, the number of possible $n$-digit binary sequences is $2^n$ and for the group of Table I, $\mu=2^k$ ($k=0, 1, \ldots, n$) and $\nu=2^{n-k}$. The sum of two binary sequences $U=(u_1, u_2, \ldots u_n)$ and $V=(v_1, v_2, \ldots v_n$ is defined as $$U\oplus V=(u_1\oplus v_1, u_2\oplus v_2 \ldots u_n\oplus v_n)$$

where $\oplus$ denotes modulo-2 addition and $u_i$ and $v_i$ ($i=1, 2, \ldots n$) are either 1 or 0.

All $2^n$ binary sequences form an Abelian group by this definition of a sum. The codewords of an $(n, k)$ group code form a subgroup of this group whose number of codewords is $2^k$. Illustratively, the first row of elements of Table II includes the codewords of a group code for $n=4$ and $k=2$. The elements in any other single row of the table corresponds to the codewords of a coset code.

TABLE II

| | | | |
|---|---|---|---|
| 0000 | 0101 | 1010 | 1111 |
| 0001 | 0100 | 1011 | 1110 |
| 1000 | 1101 | 0010 | 0111 |
| 1001 | 1100 | 0011 | 0110 |

*Theoretical basis for invention*

It may be said that a coset code is formed whenever an $n$-place binary sequence other than a codeword is added to each of the codewords of a redundant $n$-place binary group code. It will be shown that any coset code formed from a close-packed single error-correcting (Hamming) code out-performs that code in any memoryless binary channel of non-zero capacity which is not perfectly symmetric. In symmetric binary channels, coset codes and group codes perform equally well.

It will be assumed herein that each of the codewords of an $n$-place binary block code are equally likely to be transmitted in a general memoryless binary channel characterized by $\alpha$ and $\beta$ where $\alpha$ and $\beta$ are the probabilities that, when 0 and 1, respectively, are transmitted, they are received incorrectly ($\alpha, \beta\geq 0, \alpha+\beta<1$). In the Hamming code case, $n=2^m-1$ ($m=1, 2 \ldots$). It is noted that the number of codewords of weight $i(i=0, 1, \ldots, n)$ may be found as the coefficient of $x^i y^{n-i}$ in the expansion of the following generating function, $$Fh=\frac{1}{n+1}[(y+x)^n+n(y+x)^{(n-1)/2}(y-x)^{(n+1)/2}] \quad (1)$$

It may be shown that every coset code derived from some Hamming code H has the following generating function for the distribution of the weights of its codewords.

$$Fc=\frac{1}{n}\left(y\frac{\delta}{\delta x}+x\frac{\delta}{\delta y}\right)Fh \quad (2)$$

The difference between P(H), the average probability of correct transmission of a close-packed single error-correcting binary group code, and P(C), the average probability of correct transmission of any coset code derived from this code, is now to be determined. Using $p_k$ (B) to denote the average probability of a $k$-tuple ($k=0, 1, \ldots, n$) error occurring during the transmission of codewords from a binary block code B, this difference is expressed as $$P(H)-P(C)=p_0(H)-p_0(C)+p_1(H)-p_1(C) \quad (3)$$

It may be shown that if all N codewords of any binary block code B are equally likely to be transmitted in a memoryless binary channel characterized by $\alpha$ and $\beta$ as above, then $$p_k(B)=\frac{1}{N}\sum_{u=0}^{k}\frac{(-1)^{k-u}}{u!}\cdot\binom{u-u}{n-k}D^u F_B \quad (4)$$

evaluated at $x=1-\beta$, $y=1-\alpha$, where D is the linear differential operator $$D=\frac{\delta}{\delta x}+\frac{\delta}{\delta y} \quad (5)$$

Noting that $N=2^{n-m}$ for the codes under consideration, (4) may be used to rewrite (3)

$$P(H)-P(C)=\sum_{k=0}^{1}2^{m-n}\sum_{u=0}^{k}\frac{(-1)^{k-u}}{u!}\cdot\binom{u-u}{n-k}D^u(Fh-Fc)$$
$$=2^{m-n}[D(Fh-Fc)-(n-1)(Fh-Fc).] \quad (6)$$

From (1) and (2) there is obtained $$Fh-Fc=(y+x)^{(n-1)/2}(y-x)^{(n+1)2} \quad (7)$$

and thus $$P(H)-P(C)=2^{m-n}(n-1)(2-\alpha-\beta)^{(n-3)/2}(\alpha-\beta)^{(n+1)/2}(\alpha+\beta-1) \quad (8)$$

when evaluated at $x=1-\beta$, $y=1-\alpha$.

As $\alpha+\beta<1$ and $(n+1)/2$ is always even, (8) is always nonpositive and is equal to zero only in the symmetric channel case of $\alpha=\beta$. In order to provide some indication of the degree by which code C out-performs code H, the case $1\gg\beta\gg\alpha$ is considered. Eq. (8) then reduces to $$P(H)-P(C)=-(n-1)\beta^{(n+1)/2}2^{(2m-n-3)/2} \quad (9)$$

Under these conditions, $$\simeq\begin{cases}1-P(H)\\ \frac{3\beta^2}{2},\ m=1\\ \frac{n(n-1)\beta^2}{8},\ m>1\end{cases} \quad (10)$$

The fractional improvement in average error rate is thus 2/3 for $n=3(m=1)$ and $$\frac{n+1}{n}\left(\frac{\beta}{2}\right)^{(n-3/2)} \quad (11)$$

an ever decreasing function of $n$, for $n>3$.

*Implementation*

The scope of the invention will be understood with reference to FIG. 1 which illustrates an embodiment 10 thereof. An information source 12 is connected via cable 14 to group code encoder 16 wherein an information words is encoded to a group codeword. The group codeword is transmitted via cable 18 to group code to coset code converter 20 wherein the group codeword is transformed to a coset codeword. The resultant coset codeword is applied via cable 22 to channel 24. After the transmission of the coset codeword on channel 24, it is applied via cable 26 to coset code to group code converter 28. The group codeword with any errors therein resultant from the perturbated transmission on channel 24 is passed via cable 30 to group code decoder 32. The group code decoder 32 corrects any errors, which have occurred in the received group codeword on channel 24, within the capability of the particular encoding and decoding technique being utilized. The reconstructed information word is transferred via cable 34 to information sink 36.

Figure 2:
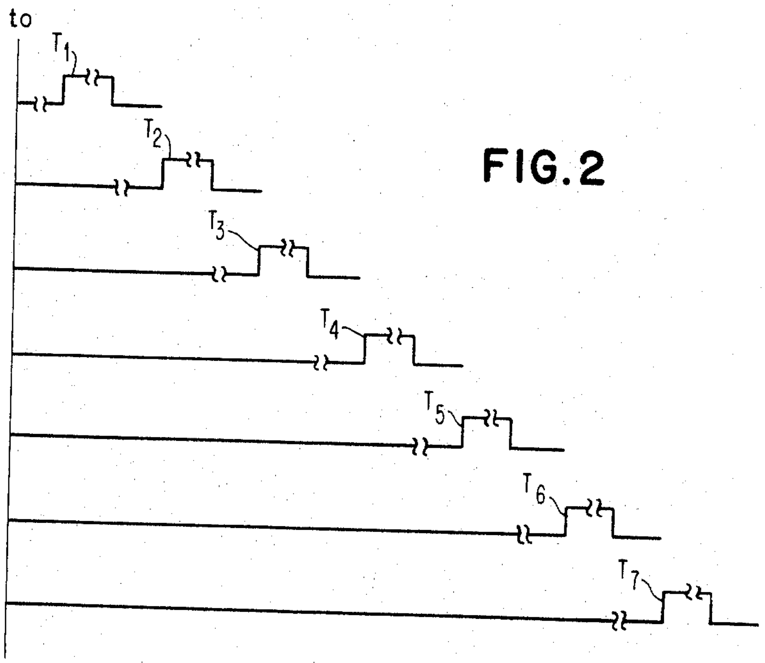
FIGURE 2 is a timing diagram for the practice of this invention as illustrated in FIGURE 1.

FIG. 2 is a timing diagram which indicates the time periods for the various operations of the embodiment 10 of FIG. 1. Each block of FIG. 1 is shown as operating in a different time period. However, this is merely illustrative and the discrete separation of time periods or their overlapping depends upon the particular apparatus involved. An information word is established in information source 12 in time period $T_1$ and is encoded to a group codeword in time period $T_2$. In time period $T_3$, the group codeword is converted to a coset codeword. The transmission of the coset codeword on channel 24 occurs in time period $T_4$. In time period $T_5$, the transmitted coset codeword is converted to a group codeword which is thereafter decoded in group code decoder 32 in time period $T_6$. The transmitted information word is applied to information sink 36 in time period $T_7$.

The practice of this invention for information characterized in binary form will be described generally with reference to FIG. 3. The embodiment 110 illustrated therein comprises information source 112 in which an information word is established as a binary digit sequence $B=b_{k-1}b_{k-2}\cdots b_0$. The binary digit sequence B is applied via cable 114 to multiplier unit 116 which provides a group codeword C by multiplying B with a generator G. If the binary digit sequence B is characterized as a vector, the multiplier G may be characterized as a matrix and the group codeword is a vector. Illustratively, $$(c_{n-1}c_{n-2}\ldots c_0)=(b_0b_1\ldots b_{k-1})\left.\begin{pmatrix}0\ldots 0g_{n-k}\ldots g_1g_0\\ 0\ 0g_{n-k}\ldots g_1g_0\ 0\\ \cdot \quad \cdot\\ \cdot \quad \cdot\\ \cdot \quad \cdot\\ 0g_{n-k}\ldots g_1g_0\ldots 0\ 0\\ g_{n-k}\ldots g_1g_0\ldots 0\ 0\end{pmatrix}\right\}k$$

If the binary digit sequence B is characterized as a polynomial $$B(X)=b_{k-1}X^{k-1}+b_{k-2}X^{k-2}+\cdots b_0X^0$$

and the generator polynomial of a cyclic code is the polynomial $$G(X)=g_{n-k}X^{n-k}+g_{n-k}X^{n-k}+\cdots g_0X^0$$

then the group codeword is the polynomial $$C(X)=B(X)xG(X)=C_{n-1}X^{n-1}+c_{n-2}X^{n-2}+\ldots c_0X^0$$

In the above examples, each row of the matrix G is a shifted form of the generator polynomial G(X). Generally, the matrix may not be associated with an equivalent cyclic code generator polynomial. Multiplier units are well known in the art of error-correcting codes for providing the product of two polynomials. Combinational logic circuits are well known in the art of error-correcting codes for providing the product of a vector and a matrix. The binary digit sequence C is applied via cable 118 to group code to coset code converter 120 which comprises register 119 in which is stored a coset leader $S_i$ and a modulo-2 adder unit 121 to provide the sum $C+S_i$. Modulo-two adder unit 121 comprises modulo-2 added units 121-1, 121-2, . . . **121-*n*. The coset leader $S_i$ binary digit sequence is applied via cable 119-1 to modulo-two adder 121. The coset codeword $C+S_i$ is applied via cable 122 to channel 124. The received coset codeword is applied from channel 124 via cable 126 to coset code to group code converter 138 which includes a storage register 127 for the coset leader $S_i$ and modulo-two subtraction unit 129. Modulo-two subtractor 129 comprises modulo-two subtraction units 129-1, 129-2, . . . 129-*n*. The binary digits of coset leader $S_i$ are applied via cable 127-1 to modulo-two subtractor 129. The coset code to group code converter 128 applies the group codeword to cable 130 which transfers it to group code decoder 132. Group code decoder 132 provides error detection and correction and ultimately the original binary digit sequence which was established in register 112**. A division operation is performed of C by G, i.e., $$\frac{C}{G}=Q+\frac{R}{G}$$

or in the case of vector and matrix operation, C is multiplied by a parity-check matrix derived from G. The quotient Q is the original B if the remainder $R=0$. If $R\neq 0$, the errors are corrected so that R becomes 0. The reconstructed binary digit sequence B is applied to cable 134 and established as the information word $$B=b_{k-1}b_{k-2}\cdots b_0$$

in information sink 136.

Figure 4:
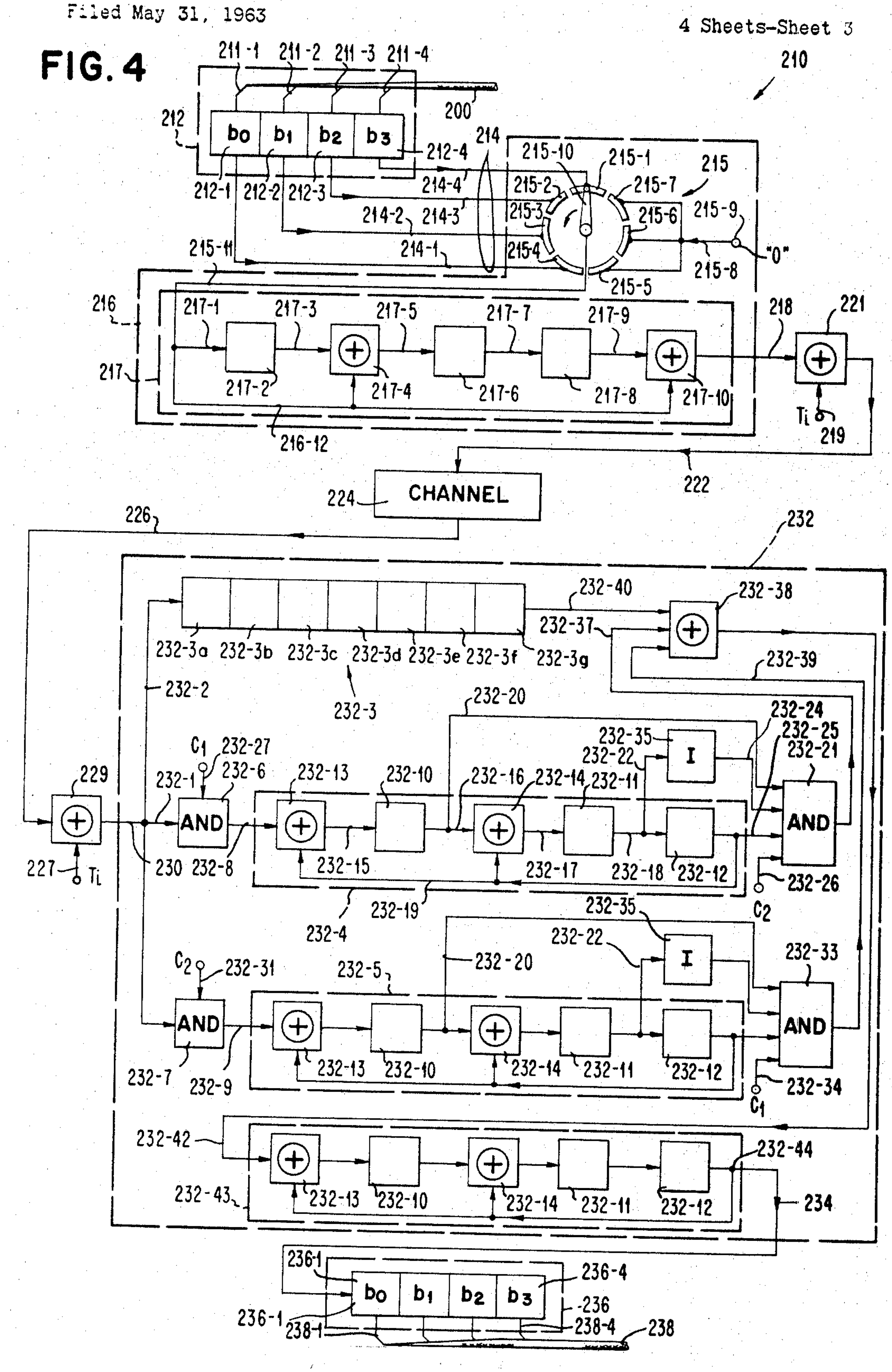
FIGURE 4 is a block diagram illustrating the practice of this invention for information transmitted in binary form.

With reference to FIGURE 4, the embodiment 210 illustrates the practice of this invention for an information word characterized as a binary digit sequence $B=b_3b_2b_1b_0$.

Figure 3:
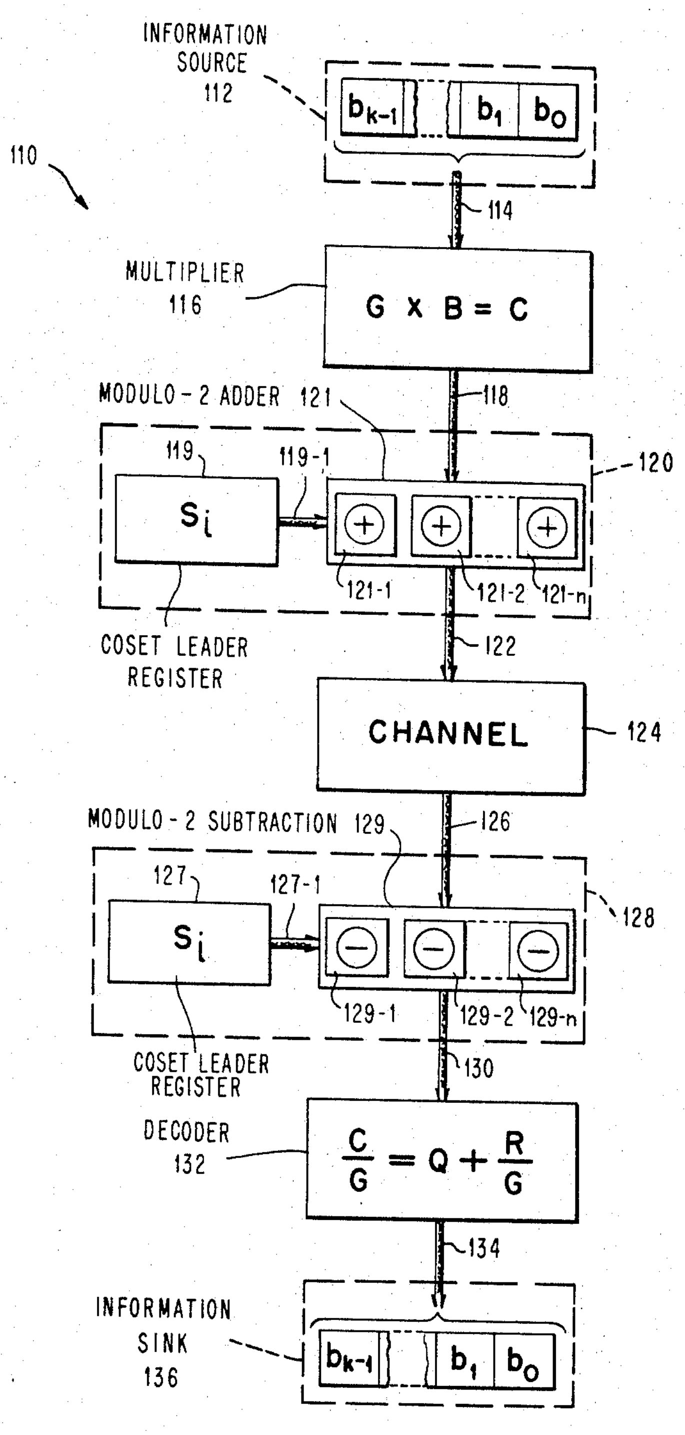
FIGURE 3 is a block diagram illustrating the use of storage registers and modulo-2 adder units for the practice of this invention.

The numbering in FIGURE 4 is analogous to FIGURES 1 and 3 in that similar units have numbers 100 and 200 larger, respectively. The nature and operation of the embodiment of FIGURE 4 will be described now generally. Hereinafter, its nature and operation will be described more particularly. Each binary digit sequence B is established in register 212 via table 211 and applied therefrom via cable 214 to multiplier unit 216 in which.

$$G(X)xB(X)=(X^3+X+1)x(b_3X^3+b_2X^2+b_1X+b_0)=C(X)$$

the corresponding group codeword is formed. C(X) is applied via line 218 to modulo-2 adder 221 which adds a coset leader $S_1(X)$ thereto when timing pulses $T_i$ are applied on line 219, i.e., certain clock pulses of the set $T_1$ to $T_7$ in FIGURE 6. The resultant coset codeword $S_1(X)+C(X)$ is applied from modulo-2 adder 221 via line 222 to channel 224. The transmitted information is applied from channel 224 via line 226 to modulo-2 subtractor 229. In modulo-2 arithmetic, the addition $\oplus$ and subtraction $\ominus$ operations are identical. The perturbated coset codeword received by modulo-2 subtractor 229 is added to $S_1(X)$ to obtain the corresponding perturbated group codeword which is applied via cable 230 to decoder 232. Timing pulses $T_i$ (FIGURE 6) applied to modulo-2 subtractor 229 via line 227 effectively apply $S_1(X)$ thereto. The decoder 232 performs the division of the perturbated group codeword by the generator polynomial G(X). If the remainder is 0, the original group codeword was received at decoder 232. If the remainder is not 0 an error has occurred. The errors in the group codeword are corrected within the capability of decoder 232 which is determined by the nature of the original group code. The corrected quotient is the original information word which was in register 212. The reconstructed information word is applied from decoder 232 via cable 234 to information sink 236.

More particularly, FIGURE 4 illustrates an embodiment of this invention for a $(n, k)=(7, 4)$ group code utilizing the coset code technique of this invention. As noted before, the numbering in FIGURE 4 is analogous to that utilized for FIGURES 1 and 3 in that the similar units having numbers 100 and 200 larger, respectively. The component digits of a binary word $B=b_3b_2b_1b_0$ are established via cable 211 in storage register 212 via lines 211–1 to 211–4 in storage units 212–1 to 212–4, respectively, thereof. Therefore, storage register 212 corresponds to information source 12 of FIGURE 1 and information source 112 of FIGURE 3. Binary digits $b_3$, $b_2$, $b_1$, and $b_0$ are applied from register 212 via cable 214 on lines 214–4 to 214–1, respectively, to contacts 215–1 to 215–4, respectively, of rotatable switch 125. Contacts 215–5, 215–6 and 215–7 extending around the periphery of switch 215 are connected via line 215–8 to signal source, not shown, corresponding to binary 0, at terminal 215–9. Rotatable switch 215 includes arm 215–10 which is rotated counter-clockwise. Switch 215 is merely illustrative. In practice, an electronic circuit may be utilized. Arm 215–10 is connected via line 215–11 and line 217–1 to shift register stage 217–2 of shift register device 217 which is connected via line 217–3 to an input of modulo-2 adder unit 217–4. Modulo-2 adder unit 217–4 is connected via connection 217–5 to storage unit 217–6. Storage unit 217–6 is connected via line 217–7 to storage unit 217–8. Storage unit 217–8 is connected via line 217–9 to an input of modulo-2 adder unit 217–10. The output of modulo-2 adder unit 217–10 is connected to line 218. The input of storage unit 217–2 is connected via line 217–12 to inputs of modulo-2 adder units 217–4 and 217–10.

Line 218 from modulo-2 adder unit 217–10 is connected to an input of modulo-2 adder 221. Line 219 from a source of clock pulses $T_i$ (FIGURE 6) is also connected to an input of modulo-2 adder unit 221. The binary digits are established on line 219 by certain clock pulses $T_i$ to modify the group codeword being applied to modulo-2 adder unit 221 via input line 218 to obtain therefrom a corresponding coset codeword. As will be described in greater detail hereinafter, a simple implementation is obtained by utilizing every seventh clock pulse, i.e., $T_i$ to effect the conversion of the group codeword to the coset codeword.

The output of modulo-2 adder unit 221 is connected via line 222 to the input of channel 224. The output of channel 224 is connected via line 226 to an input of modulo-2 adder 229. Line 227 is also connected to an input of modulo-2 adder unit 229. By applying the same clock pulses $T_i$ accounting for the time delay in channel 224, the binary sequence streaming from the output of channel 224 is modified to provide the inverse change obtained at modulo-2 adder unit 221 on the group codeword provided by encoder 217. Essentially, modulo-2 adder 229 is a subtractor unit, but as modulo-2 addition and modulo-2 subtraction are identical for the purpose of embodiment 210, the unit 229 is considered to be a modulo-2 adder. The corresponding unit hereinafter has been termed a modulo-2 subtractor unit, e.g., with respect to unit 128 of FIGURE 3.

Since close-packed single-error correcting (Hamming) codes are employed for the embodiment of FIGURE 4, all cosets of the group code are equally good for protection of information against errors on an asymmetric channel in that all cosets have exactly the same distribution of codeword weights; the number of 1's in a binary codeword is its weight. This allows the most easily implemented coset leader to be chosen for an implementation of the invention. In the specific operation of FIGURE 4 to be described hereinafter, a coset leader with only a single 1 is utilized and therefore the circuit which performs the conversion from group code to coset code and similarly the circuit which performs the conversion from coset code to group code changes every seventh binary digit. The time phasing is such that the same binary digit position is changed by modulo-2 adders 221 and 229.

The output of modulo-2 adder 229 is connected via line 230 to terminal 232–1 of decoder unit 232. Terminal 232–1 is connected via line 232–2 to the input of shift register 232–3 which has seven storage units **232–3*a* to 232–3*g*. Terminal 232–1 is also connected via AND gates 232–6 and 232–7 and via lines 232–8 and 232–9, respectively to the inputs of shift register dividers 232–4 and 232–5. Shift register 232–4 includes storage units 232–10 to 232–12 and modulo-2 adder units 232–13 and 232–14. Input line 232–8 is connected to an input of modulo-2 adder unit 232–13. The output of modulo-2 adder unit 232–13 is connected via line 232–15 to the input of storage unit 232–10. The output of storage unit 232–10 is connected via line 232–16 to an input of modulo-2 adder unit 232–14. The output of modulo-2 adder unit 232–14 is connected to the input of storage unit 232–11 via line 232–17. The output of storage unit 232–11 is connected via line 232–18 to storage unit 232–12. The output of storage unit 232–12 is connected via line 232–19 to the inputs of modulo-2 adder units 232–13 and 232–14**. Line 232–16 between storage unit 232–10 and modulo-2 adder unit 232–14 is connected via line 232–20 to an input of AND unit 232–21. Line 232–18 between storage unit 232–11 and storage unit 232–12 is connected via line 232–22, inverter unit 232–23 and line 232–24 to an input of AND unit 232–21. The output of storage unit 232–12 is connected via line 232–25 to an input of AND unit 232–21. Signal $C_2$ (FIGURE 6) terminal is connected via line 232–26 to an input of AND unit 232–21 and to an input of AND gate 232–7 via line 232–31. Signal $C_1$ (FIGURE 6) terminal is connected via line 232–34 to an input of AND gate 232–33 and via line 232–27 to an input of AND gate 232–6. Signals $C_1$ and $C_2$ are inverse signals. The construction of shift register divider 232–5 and inverter 232–35 associated therewith and the related connections are identical to those for shift register divider 232–4 and inverter 232–23. By signals $C_1$ and $C_2$ each alternate perturbated group codeword received at terminal 232–1 of decoder 232 is applied to shift registers 232–4 and 232–5, alternatively.

The output of AND unit 232–21 is connected via line 232–37 to modulo-2 adder unit 232–38. AND unit 232–33 is connected via line 232–39 to an input of modulo-2 adder unit 232–38. The output of shift register 232–3 from storage unit 232–3*g* thereof is connected via line 232–40 to an input of modulo-2 adder unit 232–38.

The output of modulo-2 adder unit 232–38 is connected via line 232–42 to an input of modulo-2 adder circuit 232–13 of shift register divider 232–43 which is identical in construction to that of shift register dividers 232–4 and 232–5. The output terminal 232–44 of shift register 232–43 is connected via line 234 to shift register 236 which is comparable to the information sinks 36 and 136 of FIGURES 1 and 3, respectively. Shift register 236 comprises storage units 236–1 to 236–4, in which are established $b_0$, $b_1$, $b_2$, $b_3$, respectively. The outputs of storage units 236–1 to 236–4 are applied to output lines 238–1 to 238–4, respectively, during clock pulse time $T_1$.

The operation of the embodiment 210 of FIGURE 4 will now be described in greater detail. As the received binary digits are delivered from the channel 224 through the modulo-2 adder 229 wherein the conversion is made from the perturbated coset codeword to the corresponding perturbated group codeword, they enter register 232–3. Simultaneously, depending upon whether it is an alternate odd transmission of a codeword or an alternate even transmission of a codeword, they are passed by either AND gate 232–6 (odd case) or AND gate 232–7 (even case) by signals $C_1$ and $C_2$, respectively. At the same time that the received binary digit sequence is entering shift register 232–3, it is being processed by one of the divider shift register divider 232–4 or 232–5. For example, an odd codeword is processed by the register 232–4. At the end of the seventh binary digit time $T_7$, the contents of shift register 232–4 is the error syndrome. At this point the next codeword begins to enter shift register divider 232–5, and register 232–3. Meanwhile, the contents of shift register 232–4 is cycled until the cycled remainder corresponding to a single error in the position about to be delivered from shift register 232–3 to modulo-2 adder 232–38 appears in shift register 232–4. For this embodiment, the required remainder is 101 in stages 232–10 to 232–12, respectively. The binary digit which then passes to modulo-2 adder unit 232–38 is changed by the signal generated by AND gate 232–21. At the end of the transmission of an even codeword, the contents of the shift register divider 232–5 is processed as was the contents of the shift register 232–4 in the case of the transmitted odd codeword. The binary digits which leave modulo-2 adder unit 232–38 to correspond to corrected codewords of the group code and are then introduced into the shift register divider 232–43 via line 232–42. The output of divider 232–43 on terminal 232–44 corresponds to an original 1 binary digit sequence B established in register 212, i.e., a sequence of four information binary digits followed by three 0's. If it is desired to isolate the four information binary digits this may be accomplished through suitable buffering arrangements. One such arrangement would be to apply the contents of register 236 to cable 238 each clock pulse time immediately after the high order binary digit $b_3$ reaches the shift register position 236–4 of 236, i.e., clock pulse $T_1$. In summary, within the error-correction capability of the decoder 232, the correct group codeword is applied from modulo-2 adder to divider 232–4.

This decoder 232 provides continuous decoding of perturbated group codewords applied thereto on terminal 232–1. This continuous decoding is accomplished through the use of three shift registers 232–4, 232–5 and 232–43 and storage register 232–3. While FIGURE 4 has been designed for a single error-correcting code, a multiple error-correcting code could be handled readily by testing cycled remainders in register 232–4 and 232–5 for several syndrome patterns. The AND units 232–21 and 232–33 would be replaced by appropriate combinational logic circuits. Generally, two shift register dividers are required, one to obtain the syndromes and a second to process the syndromes (changing roles each word time). A third shift register is required to perform the inversion if such inversion is desired, i.e., the transformation from group codeword to information word.

The basic nature of the shift register multiplier 217 and shift register dividers 232–4, 232–5 and 232–43 will now be described. The noted book by W. W. Peterson on error-correct codes is a suitable background reference for greater details concerning the operation of multipliers and dividers for cyclic group codes than are provided herein. For the multiplier 217 it is assumed that the input binary digit sequence is introduced high order digit first. When a high order binary digit comes in, it introduces 1's at three positions. Considering the four shift register positions (in this case only three actual positions 217–2, 217–6 and 217–8) as the fourth position is the output line 218, the output line 218 represents $X^3$, stage 217–8 represents $X^2$, stage 217–6 represents $X^1$, and the input stage 217–2 represents $X^0$. The high order 1 thus introduces 1's at $X^3$, $X^1$ and $X^0$. The next shift causes these 1*'s* to assume the roles of $X^4$, $X^2$ and $X^1$, respectively. If the next lower order position is also 1, it would cause 1's to be added to position $X^3$, $X^1$ and $X^0$. After the four binary digits from register 212 and the three binary 0's from terminal 215–9 have been processed by multiplier 217, the groups codeword has been applied to modulo-2 adder 221 or line 218.

The shift register dividers operate in much the same manner as multiplier 217. The input binary digit sequence corresponds to the dividend. When a 1 leaves the 232–12 position of the register, a quotient binary digit is generated thus causing the subtraction of $X^3+X+1$ from the contents of the register. The $X^3$ position is not necessary as the shifted out 1 corresponds to an entry in the $X^3$ position and it is known that this entry is always eliminated by the subtraction of $X^3+X+1$. Therefore, it is only necessary to subtract the $X+1$ terms.

The timing operation of the embodiment of FIG. 4 will now be described particularly with reference to FIG. 6. Clock pulses $T_1$ to $T_7$ establish the binary digit clock time. The delay in channel 224 must be taken account of by appropriate phasing. Certain clock pulses $T_1$ are selected to be applied to lines 219 and 227 to effect the addition and subtraction, respectively, of a coset leader $S_i$ to the group codeword C at modulo-2 adder 221 and from the transmitted perturbated coset codeword at modulo-2 adder 229.

During time period $T_8$, which occurs during some part of the interval of $T_5$ to $T_7$, applies the binary digit sequence $B=b_3, b_2, b_1, b_0$ from register 212 to switch 215, and allows the next information word B on cable 211 to enter register 212. Pulse $T_1$ applies the reconstructed B established in register 236 to cable 238. Signal $C_1$ and $C_2$ are utilized to cause alternate perturbated group codewords applied to terminal 232–1 of decoder 232 to be applied to shift registers 232–4 and 232–5, respectively. Signals $C_1$ and $C_2$ enable AND units 232–33 and 232–21 respectively, and thereby effect correction of errors in the perturbated group codeword in register 232–3 which is being applied to modulo-2 adder 232–38.

Figures 5, 6, 7:
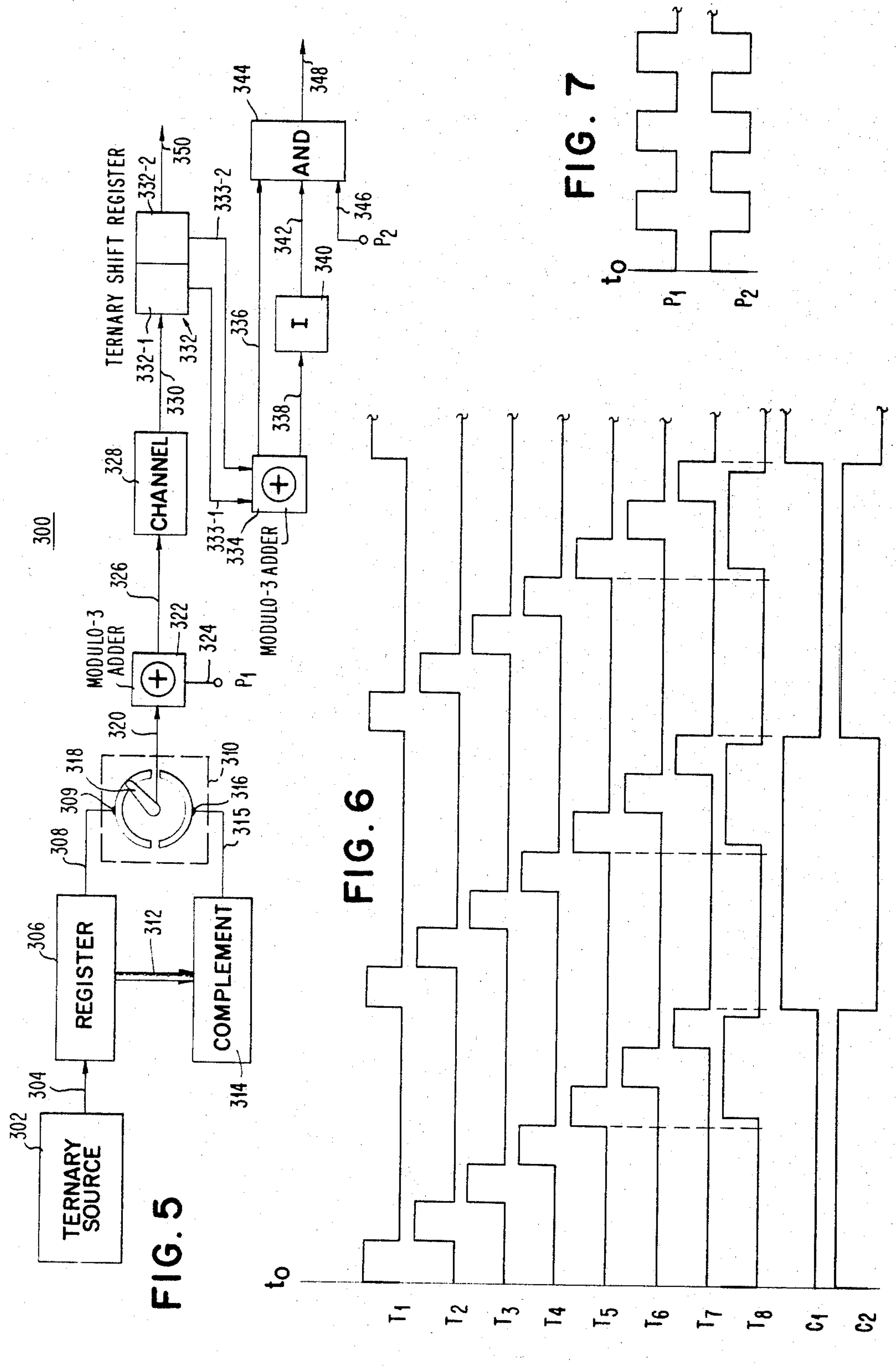
FIGURE 5 is a block diagram illustrating the practice of this invention for transmission of information in ternary form.
FIGURE 6 is a timing diagram for the apparatus illustrated in FIGURE 4.
FIGURE 7 is a timing diagram for the apparatus illustrated in FIGURE 5.

With regard to the timing for FIG. 4, as shown in FIG. 7, clock pulse $T_1$ corresponds to high order binary digit time. Clock pulse $T_7$ has been chosen to perform the group code to coset code conversion. These timing diagrams are schematic for illustrative purposes and are not the pulse waveforms that would actually be used in the embodiment. The block timing waveform shown as $T_8$ may start any time after the beginning clock pulse $T_5$ and may end at any time before the end of clock pulse $T_7$. During this time the contents of 212 is changed in a parallel manner. At the receiving end the clock pulse $T_1$ is employed. The contents of the register 236 is applied in parallel to output cable 238 during clock period $T_1$.

FIG. 5 illustrates the practice of this invention using modulo-3 arithmetic to convert a group code to the corresponding coset code and to reconvert the transmitted ternary digit sequence to the original transmitted group code. The nature of the embodiment of FIG. 5 will be described now and the operation thereof will be described hereinafter. The embodiment 300 comprises ternary source 302 in which information in ternary form is established. Ternary source 302 is connected via line 304 to register 306. The output of register 306 is connected via line 308 to terminal 309 of switch 310 and via cable 312 to complement unit 314, in which is established the complement of the ternary information established in register 306. The output of complement unit 314 is connected via line 315 to terminal 316 of switch 310. Switch contact 310 has rotatable contact member 318 which is connected to line 320. The switch 310 is illustrative merely of the function of the switch. Usually, it will be incorporated in the circuitry with an electronic counterpart. Line 320 from switch contact member 318 is connected to modulo-3 adder unit 322. $P_1$ clock pulses (FIG. 7) are applied to modulo-3 adder unit 322 via line 324. The modulo-3 sum of a coset leader and the group codeword being applied to modulo-3 adder 322 is obtained and applied to line 326. The output of modulo-3 adder unit 322 on line 326 is applied to channel 328. The output of channel 328 is connected via line 330 to the input of ternary shift register 332 which has storage units 332–1 and 332–2 in which are established the digits of the transmitted ternary sequence. The outputs of storage unit 332–1 and 332–2 are connected to the inputs of modulo-3 adder unit 334 via lines 333–1 and 333–2, respectively. The binary outputs from modulo-3 adder unit 334 appear on lines 336 and 338. Line 336 is connected to AND unit 344. Line 338 is connected to inverter unit 340 which is connected via line 342 to an input of AND unit 344. $P_2$ clock pulse (FIG. 7) terminal is connected via line 346 to AND unit 344. An output from AND unit 344 on line 348 indicates that the representation in storage unit 332 is correct. An output from storage unit 332 on line 350 as the original ternary information group codeword in register 306.

The operation of the embodiment of FIG. 5 for the case of a two-digit ternary code of three codewords will now be described in greater detail. The group codewords are 00, 12 and 21. The coset employed has as its coset leader 11 and hence the coset codewords are 11, 20 and 02. This code is employed in an error-detection mode. Therefore, at the receiver a check is made to determine as to whether each codeword's digits sum to two, namely one+one=two; two−zero=two and zero+two=two. The circuit for doing this is shown in FIG. 5 and works in the following manner. A two digit ternary shift register 332 feeds a two-input modulo-3 adder 334 from stages of the ternary shift register 332–1 and 332–2, respectively. The modulo-3 adder 334 has two binary output lines 336 and 338. Line 336 carries the weight two and line 338 carries the weight one. In order to detect whether the sum of the digits in stages 332–1 and 332–2 are two, a check is made to determine if the line 336 has a one and 338 has a zero. This is accomplished by the inverter 340 and the gate 344. The output of AND unit 344 will be one only at even digit times if the contents of register 332 correspond to a codeword. A one will not appear when the last digit of a previous codeword plus the first digit of the next codeword sum is two as line 348 is only one when a received codeword is in ternary shift register 332.

The timing operation of the embodiment of FIG. 5 will now be described particularly with reference to the timing diagram of FIG. 7. Pulses $P_1$ and $P_2$ are applied to modulo-3 adder 322 and AND unit 344. They are appropriately placed to account for the delay in channel 328. Pulse $P_2$ effects the transformation of a ternary group codeword to a ternary coset codeword. Pulse $P_2$ enables AND unit 344 to indicate on line 348 an error in the perturbated ternary coset codeword. The perturbated coset codeword from ternary shift register 332 is applied to line 350.

While the invention has been particularly shown and described with reference to preferred embodiment thereof, it will be understood by those skilled in the art that the foregoing and other changes in form and details may be made therein without departing from the sprit and scope of the invention.

What is claimed is:

1. Apparatus for handling an information word which comprises:

a source of said information word;

means for converting said information word to a group codeword;

means for converting said group codeword to a coset codeword;

a channel receptive of said coset codeword;

means receptive of said coset codeword from said channel as perturbated thereby to provide a perturbated group codeword from said received perturbated coset codeword; and decoder means for reconstructing said original information word from said perturbated codeword including first and second divider shift registers;

a storage register;

a syndrome or partity check sequence shift register whereby each group codeword is established in said storage register and each alternate group codeword is established in said first and second divider shift registers, respectively, first and second AND unit means connected to said first and second divider shift registers;

a modulo-2 adder unit connected to said storage shift register and said AND units to provide correction of errors in each said group codeword established in said storage register;

said modulo-2 adder unit being connected to said syndrome shift register, said syndrome shift register providing said information word.

2. Apparatus for decoding a group codeword comprising:

first and second divider shift registers;

a storage register;

a syndrome or partity check sequence shift register whereby each group codeword is established in said storage register and each alternate group codeword is established in said first and second divider shift registers, respectively, first and second AND unit means connected to said first and second divider shift register;

a modulo-2 adder unit connected to said storage shift register and said AND units to provide correction of errors in each said group codeword established in said storage register;

said modulo-2 adder unit being connected to said syndrome shift register;

said syndrome shift register providing said information word.

References Cited

UNITED STATES PATENTS

| | | | |
|---|---|---|---|
| 2,849,532 | 8/1958 | Hennig | 340—146.1 |
| 2,926,215 | 2/1960 | Slepian | 340—146.1 |
| 2,954,432 | 9/1960 | Lewis | 340—146.1 |
| 3,051,784 | 8/1962 | Neumann | 340—146.1 |
| 3,159,810 | 12/1964 | Fire | 340—146.1 |
| 3,213,426 | 10/1965 | Melas | 340—146.1 |
| 2,884,625 | 4/1959 | Kippenham | 340—345 |

OTHER REFERENCES

W. W. Peterson: Error Correcting Codes, MIT Press (1961), pp. 1–3 and 30–38.

C. V. Freiman: On the Use of Coset Codes in Asymmetric Channels," IEEE Transactions on Information Theory, vol. IT–9, No. 2, April 1963, p. 118. Q 350–12.

MALCOLM A. MORRISON, *Primary Examiner.*

C. E. ATKINSON, *Assistant Examiner.*